(12) United States Patent
Fayolle et al.

(10) Patent No.: US 12,172,769 B2
(45) Date of Patent: Dec. 24, 2024

(54) SYSTEM AND METHOD FOR COOLING A FLUID OF A LUBRICATION OR COOLING CIRCUIT OF A DRIVE UNIT OF AN AIRCRAFT, AND AIRCRAFT PROPULSION ENGINE PROVIDED WITH SUCH A COOLING SYSTEM

(71) Applicant: LIEBHERR-AEROSPACE TOULOUSE SAS, Toulouse (FR)

(72) Inventors: Laurent Fayolle, Toulouse (FR); Guillaume Galzin, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 406 days.

(21) Appl. No.: 17/267,797

(22) PCT Filed: Aug. 6, 2019

(86) PCT No.: PCT/FR2019/051906
§ 371 (c)(1),
(2) Date: Feb. 10, 2021

(87) PCT Pub. No.: WO2020/030874
PCT Pub. Date: Feb. 13, 2020

(65) Prior Publication Data
US 2021/0163147 A1    Jun. 3, 2021

(30) Foreign Application Priority Data
Aug. 10, 2018   (FR) ...................................... 1870922

(51) Int. Cl.
*B64D 33/10*     (2006.01)
*B64D 33/02*     (2006.01)

(52) U.S. Cl.
CPC ............. *B64D 33/10* (2013.01); *B64D 33/02* (2013.01); *B64D 2033/0286* (2013.01)

(58) Field of Classification Search
CPC ........ F05D 2260/204; F02C 7/20; F02C 7/14; F02C 7/185
See application file for complete search history.

(56) References Cited

U.S. PATENT DOCUMENTS 10,145,304 B2 * 12/2018 Weiner .................... F01D 25/18
2006/0042225 A1   3/2006 Bruno et al.
(Continued)

*Primary Examiner* — Thuyhang N Nguyen
(74) *Attorney, Agent, or Firm* — CRGO Global; Steven M. Greenberg

(57) ABSTRACT

The invention relates to a system for cooling a fluid of a circuit (20) for lubricating a propulsion engine (10) of an aircraft, the engine comprising a nacelle (11) which extends in a longitudinal direction (X) between an air inlet opening (12) and an ejection nozzle (13), a turbomachine (14) having a casing (15) secured inside said nacelle by rectifier arms (16), and a fan (17) arranged at said air inlet opening (12) of said nacelle, upstream of said turbomachine (14), and designed to be able to generate a primary air flow feeding said turbomachine and a secondary air flow feeding a channel, referred to as a secondary channel (18), formed between said nacelle (11) and said casing (15) of said turbomachine, characterized in that said cooling system comprises a skin exchanger (30) which is arranged on an inner wall of said nacelle (11), longitudinally between said air inlet opening (12) of said nacelle and said rectifier arms (16), said skin exchanger being in fluid communication with said fluid circuit and designed to be able to provide heat exchanges between said lubricating fluid and the air flowing through said secondary channel.

8 Claims, 2 Drawing Sheets

(56) References Cited

U.S. PATENT DOCUMENTS

| | | | |
|---|---|---|---|
| 2008/0053060 A1* | 3/2008 | Olver | F02C 7/14 |
| | | | 60/226.1 |
| 2008/0095611 A1* | 4/2008 | Storage | F28F 1/022 |
| | | | 415/116 |
| 2011/0146051 A1* | 6/2011 | Hand | F02K 1/822 |
| | | | 29/525.01 |
| 2016/0216038 A1* | 7/2016 | Pelissier | F28D 9/0093 |
| 2018/0238270 A1 | 8/2018 | Roberge | |

* cited by examiner

SYSTEM AND METHOD FOR COOLING A FLUID OF A LUBRICATION OR COOLING CIRCUIT OF A DRIVE UNIT OF AN AIRCRAFT, AND AIRCRAFT PROPULSION ENGINE PROVIDED WITH SUCH A COOLING SYSTEM

CROSS-REFERENCE TO RELATED APPLICATIONS

This application is a § 371 national phase entry of International Application No. PCT/FR2019/051906, filed Aug. 6, 2019, which claims priority to French Patent Application No. 1870922, filed Aug. 10, 2018.

1. TECHNICAL FIELD OF THE INVENTION

The invention relates to a system for cooling a fluid for lubricating or cooling a component of a propulsion engine of an aircraft. The invention also relates to a propulsion engine of an aircraft provided with such a system for cooling a (lubricating or cooling) fluid, hereinafter referred to as a fluid circuit.

2. TECHNOLOGICAL BACKGROUND

It is known that a propulsion engine of an aircraft, regardless of type (gas turbine, electric motor, etc.), has to provide a lubrication system for its various parts (bearings, thrust bearings, gears, accessory boxes, reduction housing, etc.). It is common for such a lubrication system to use a fluid of the lubricating oil type, also referred to as engine oil. This engine oil has to be cooled to allow the heat absorbed during its passage through the various lubricated parts to be dissipated.

It is also known that a number of components of a propulsion engine have be cooled by a cooling circuit. For example, in the case of an electric propulsion engine, this may be the electric generator or the starter of this generator. Such a cooling circuit generally uses a cooling fluid which is brought into contact with the components to be cooled in order to absorb the heat dissipated by these components. The fluid of this cooling circuit has to be cooled in order to be able to perform its cooling function.

Thus, most aircraft are provided with a system for cooling a fluid (which is generally an oil for a lubrication circuit and a heat transfer fluid for a cooling circuit), which system generally comprises finned heat exchangers cooled either by bleeding air from the secondary flow of the engine, better known as fan air or "bypass air," or by immersing the fins of the heat exchangers directly into the air flow of this secondary flow.

Bleeding air from the secondary flow reduces engine energy performance by increasing engine fuel consumption. Arranging the fins directly in the fan air flow creates pressure drops and disturbances in the flow of air, which reduces engine thrust.

In an aircraft engine with a very high bypass ratio, the pressure losses and flow disturbances in the fan air are no longer acceptable, because they greatly reduce the engine thrust. Furthermore, the negative impact of an air bleed on the engine's kerosene consumption is much greater than that of a conventional aircraft engine. In addition, the volume available for the cooling system is reduced compared with that of a conventional aircraft engine.

For an aircraft engine comprising a reduction gearbox, the heat output transmitted to the lubricating oil is much higher than on a conventional aircraft engine (approximately 3 times higher), which necessitates oversizing the oil cooling system.

There is therefore the need for a new engine oil cooling system which can be used both on standard aircraft engines and on propulsion engines with a high bypass ratio.

There is also a need for a new system for cooling a fluid of a circuit for cooling an engine component, such as an electric generator, and in general any engine component to be cooled.

3. AIMS OF THE INVENTION

The invention therefore aims to provide a system and a method for cooling a fluid of a circuit, referred to as a fluid circuit, for fluid lubrication or cooling of a component of a propulsion engine of an aircraft, which system and method overcome at least some of the drawbacks of known systems and methods.

The invention aims in particular to provide, in at least one embodiment, a system and a method for cooling a fluid of a fluid circuit which do not impede either fuel consumption or engine thrust.

The invention aims in particular to provide, in at least one embodiment, a system for cooling a fluid of a fluid circuit which is more compact compared with known systems.

The invention also aims to provide, in at least one embodiment, a system and a method for cooling a fluid of a fluid circuit which help to improve the thrust of the propulsion engine.

The invention also aims to provide, in at least one embodiment, a system and a method for cooling a fluid of a fluid circuit which are particularly suitable for aircraft engines with a high bypass ratio and/or with a reduction gearbox.

The invention also aims to provide, in at least one embodiment, a system and a method for cooling a fluid of a fluid circuit which allow better cooling of the lubricating fluid than the known systems and methods.

Other aims of the invention will also emerge from the following description and from the various embodiments described.

4. DISCLOSURE OF THE INVENTION

To this end, the invention relates to a system for cooling a fluid of a circuit, referred to as a fluid circuit, for lubricating or cooling at least one component of a propulsion engine of an aircraft, the engine comprising an outer casing which extends in a longitudinal direction between an air inlet opening and an ejection nozzle, a turbomachine having a turbomachine casing secured inside said outer casing by rectifier arms, and a fan arranged at said air inlet opening of said outer casing, upstream of said turbomachine, and designed to be able to generate a primary air flow feeding said turbomachine and a secondary air flow feeding a channel, referred to as a secondary channel, formed between said outer casing and said turbomachine casing.

A cooling system according to the invention is characterized in that it comprises a smooth heat exchanger, referred to as a skin exchanger, which does not comprise a fin immersed in said secondary air flow, and which is arranged on an inner wall of said outer casing, longitudinally between said fan and said rectifier arms, said skin exchanger being in fluid communication with said fluid circuit in order to be able to provide heat exchanges between said fluid of said fluid circuit and the air flowing through said secondary channel.

A system according to the invention therefore makes it possible to cool the fluid of the fluid circuit (which is either a fluid for lubricating at least one engine component, or a fluid for cooling at least one engine component) by means of a smooth skin exchanger which does not comprise a fin immersed in the secondary air flow, is accommodated between the fan and the rectifier arms, and allows heat exchanges between the fluid of the fluid circuit and the air from the secondary flow, without disturbing the secondary air flow or impeding fuel consumption.

The skin exchanger is arranged between the fan and the rectifier arms of the engine, i.e. in a region of the engine where the flow of air is greatly disturbed. This advantageous arrangement of the skin exchanger between the blades of the fan and those of the rectifier makes it possible to take advantage of the strong turbulence of the flow of air in this region, which increases heat exchanges and therefore the cooling capacity of the exchanger.

A system according to the invention also makes it possible to cool the lubricating or cooling fluid as soon as the engine is running, including when the aircraft exhibits low velocity, or even zero velocity.

The heat exchanges between the lubricating or cooling fluid and the air flow of the secondary channel result in an increase in the temperature of the secondary air flow downstream of the skin exchanger, which helps to improve the thrust of the propulsion engine.

A system according to the invention therefore makes it possible not only to reduce the impact of the cooling system on the performance and fuel consumption of the engine, but also to increase the engine thrust, while increasing the cooling capacity of the fluid.

Such a system is therefore particularly advantageous for new aircraft engines with very high bypass ratios and/or with a reduction gearbox.

Advantageously and according to the invention, the skin exchanger is curved.

Such an exchanger therefore makes it possible to match the shape of the inner wall of the outer casing of the engine.

The outer casing of a propulsion engine is generally formed by an outer annular body in which the fan is accommodated and which is connected to a second outer annular body in which the turbomachine is accommodated and which is itself connected to a nacelle, the turbomachine being supported by the rectifier arms. Throughout the following text, the term nacelle means, through misuse of language, the outer casing of the propulsion engine which extends from the air inlet opening to the ejection nozzle.

Advantageously and according to this variant, said skin exchanger extends over the entire circumference of said inner wall of said outer casing.

This advantageous variant makes it possible to maximize heat exchanges by providing a curved skin exchanger which extends over the entire circumference of the inner wall of said outer casing, between the air inlet opening and the rectifier arms.

Advantageously and according to the invention, said fluid circuit is a lubrication circuit, said fluid is a lubricating oil and said skin exchanger comprises flow channels for this lubricating oil.

According to another variant, said fluid circuit is a cooling circuit, said fluid is a cooling fluid and said skin exchanger comprises flow channels for this cooling fluid.

The invention also relates to a circuit, referred to as a fluid circuit, for lubricating or cooling a component of a propulsion engine of an aircraft, the engine comprising an outer casing which extends in a longitudinal direction between an air inlet opening and an ejection nozzle, a turbomachine having a turbomachine casing secured inside said outer casing by rectifier arms, a fan arranged at said air inlet opening of said outer casing, upstream of said turbomachine, and designed to be able to generate a primary air flow feeding said turbomachine and a secondary air flow feeding a channel, referred to as a secondary channel, formed between said outer casing and said turbomachine casing, said fluid circuit comprising:

a lubricating or cooling fluid reservoir;
a plurality of components of said engine to be lubricated and/or cooled; and
at least one fluid flow pipe connecting said fluid reservoir and said plurality of components of said engine to be lubricated and/or cooled.

A fluid circuit according to the invention is characterized in that it further comprises a fluid cooling system according to the invention.

The advantages of a system for cooling a fluid of a fluid lubrication or cooling circuit according to the invention apply, mutatis mutandis, to a lubrication or cooling circuit according to the invention.

The invention also relates to a propulsion engine of an aircraft, the engine comprising an outer casing which extends in a longitudinal direction between an air inlet opening and an ejection nozzle, a turbomachine having a turbomachine casing secured inside said outer casing by rectifier arms, and a fan arranged at said air inlet opening of said outer casing, upstream of said turbomachine, and designed to be able to generate a primary air flow feeding said turbomachine and a secondary air flow feeding a channel, referred to as a secondary channel, formed between said outer casing and said turbomachine casing.

A propulsion engine according to the invention is characterized in that it further comprises a lubrication or cooling circuit according to the invention.

The advantages of a circuit for lubricating or cooling an engine component according to the invention therefore apply, mutatis mutandis, to a propulsion engine according to the invention.

The invention also relates to an aircraft comprising at least one propulsion engine according to the invention.

The invention also relates to a method for cooling a fluid of a circuit for lubricating or cooling at least one component of a propulsion engine of an aircraft, the engine comprising an outer casing which extends in a longitudinal direction between an air inlet opening and an ejection nozzle, a turbomachine having a turbomachine casing secured inside said outer casing by rectifier arms, and a fan arranged at said air inlet opening of said outer casing, upstream of said turbomachine, and designed to be able to generate a primary air flow feeding said turbomachine and a secondary air flow feeding a channel, referred to as a secondary channel, formed between said outer casing and said turbomachine casing.

A method according to the invention is characterized in that it includes:

arranging a skin exchanger on an inner wall of said outer casing, longitudinally between said fan and said rectifier arms; and
placing said skin exchanger in fluid communication with said fluid circuit in order to be able to provide heat exchanges between said fluid of said fluid circuit and the air flowing through said secondary channel.

A cooling method according to the invention is advantageously carried out by a cooling system according to the invention.

Conversely, a cooling system according to the invention advantageously carries out a cooling method according to the invention.

In addition, the advantages of a cooling system according to the invention apply, mutatis mutandis, to a cooling method according to the invention.

In particular, a method according to the invention makes it possible to provide cooling of a fluid of a lubrication or cooling circuit by installing a skin exchanger between the nacelle fan and the rectifier arms of the engine. It is this specific arrangement, in a region of the engine where the flow of air is greatly disturbed, which significantly improves heat exchanges between the fan air and the lubricating or cooling fluid, and therefore improves the cooling of said fluid.

In addition, the cooling method according to the invention helps to improve the thrust of the propulsion engine, given that heat exchanges between the fluid of the fluid circuit and the air flow of the secondary channel lead to an increase in the temperature of the air from the secondary flow downstream of the skin exchanger.

Advantageously and according to the invention, said step of arranging the skin exchanger on the inner wall of said outer casing involves arranging said skin exchanger over the entire circumference of said inner wall of said outer casing.

The invention also relates to a cooling method and system which are characterized in combination by all or some of the features mentioned above or below.

5. LIST OF FIGURES

Further objectives, features and advantages of the invention will become apparent upon reading the following description, which is provided solely by way of non-limiting example, and which refers to the appended drawings, in which.

6. DETAILED DESCRIPTION OF ONE EMBODIMENT OF THE INVENTION

Figure 1:
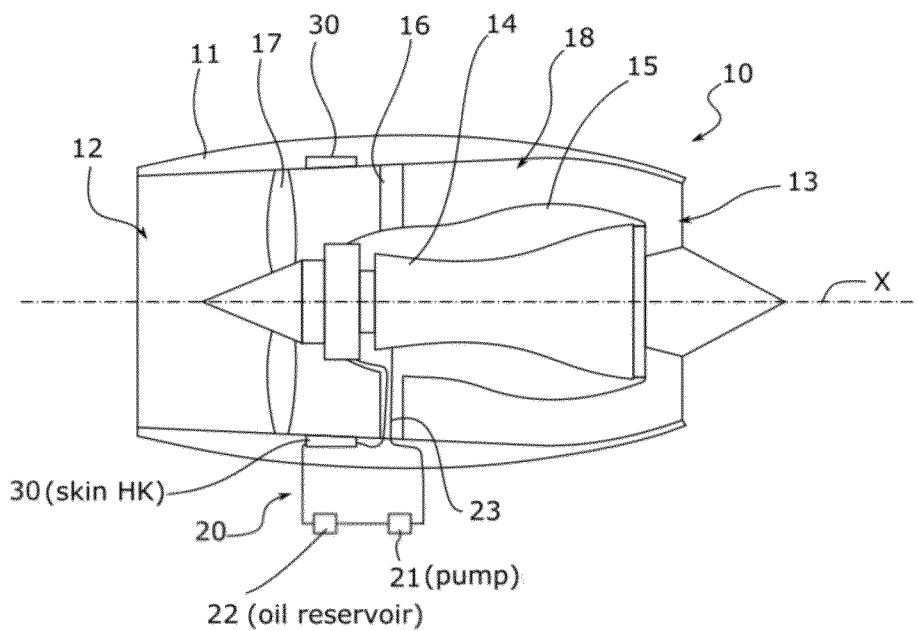
FIG. 1 is a schematic sectional perspective view of a propulsion engine according to one embodiment of the invention, the engine comprising a cooling system according to one embodiment of the invention.

For the sake of illustration and clarity, scales and proportions are not strictly adhered to in the drawings.

The longitudinal direction corresponds to the main direction of the propulsion engine, which is the direction the air follows from the air inlet opening in the nacelle to the gas ejection nozzle.

The term radial is used with respect to the axis X of symmetry of the propulsion engine, which axis extends in the longitudinal direction.

FIG. 1 schematically shows a propulsion engine 10 of an aircraft, the engine comprising an outer casing 11 which extends along a longitudinal axis X between an air inlet opening 12 and an ejection nozzle 13.

In addition, a turbomachine 14 having a turbomachine casing 15 is secured inside said outer casing 11 by rectifier arms 16. This turbomachine 14 can be of any type. It may for example be a turboshaft engine comprising a gas turbine.

A fan 17 is arranged at the air inlet opening 12.

This fan makes it possible to generate a primary air flow which feeds the turbomachine 14 and a secondary air flow which feeds a secondary channel 18 formed between the outer casing 11 and the casing 15 of the turbomachine.

FIG. 1 also shows a lubrication circuit 20 according to one embodiment of the invention, comprising a lubricating oil reservoir 21, a pump 22 and a plurality of pipes 23 for the flow of the lubricating oil between the oil reservoir and components of the engine to be lubricated, such as bearings, thrust bearings, gears, accessory boxes, or reduction housing (these are not shown in FIG. 1 for the sake of clarity). In FIG. 1, the lubrication circuit 20 is shown highly schematically for the sake of clarity. In particular, the pipes inside the turboshaft engine 14 are not shown.

According to other variants, the fluid circuit may be a cooling circuit for at least one engine component. The design of such a cooling circuit is, mutatis mutandis, identical to that described in connection with the figures describing the application of the invention to a lubrication circuit for engine components.

The lubrication circuit 20 comprises a system for cooling the lubricating oil, comprising a skin exchanger 30 arranged on the inner wall of the outer casing 11, between the fan 17 and the rectifier arms 16.

This skin exchanger 30 is designed to be able to provide heat exchanges between the lubricating fluid flowing through the pipes 23 and the air flowing through said secondary channel 18.

This skin exchanger 30 can be of any known type. It is for example formed, as shown in FIG. 2, from two metal sheets 31, 32 which face each other and define flow channels 33 therebetween for the lubricating oil, and one of the two sheets, referred to as the interface sheet, being intended to extend over the circumference of the inner wall of the outer casing.

Figure 2:
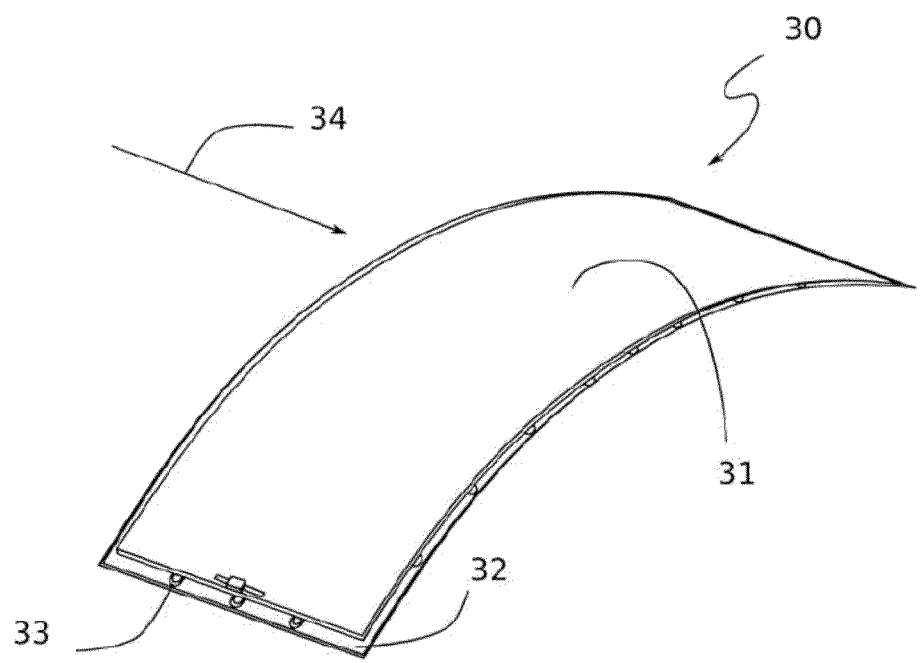
FIG. 2 is a schematic view of a skin exchanger of a cooling system according to one embodiment of the invention.

Once arranged on the circumference of the inner wall of the outer casing, which defines the outer wall of the air stream of the secondary channel 18, the air blown by the fan 17 into the secondary channel, shown schematically by the arrow 34 in FIG. 2, comes into contact with the channels 33, which allows heat exchanges with the lubricating oil flowing through these channels 33.

Of course, the skin exchanger can have other designs, in particular with respect to the circuitry of the fluid flow channels.

Thus, the skin exchanger can be the exchanger described in patent application FR3008173 by the applicant.

Figure 3:
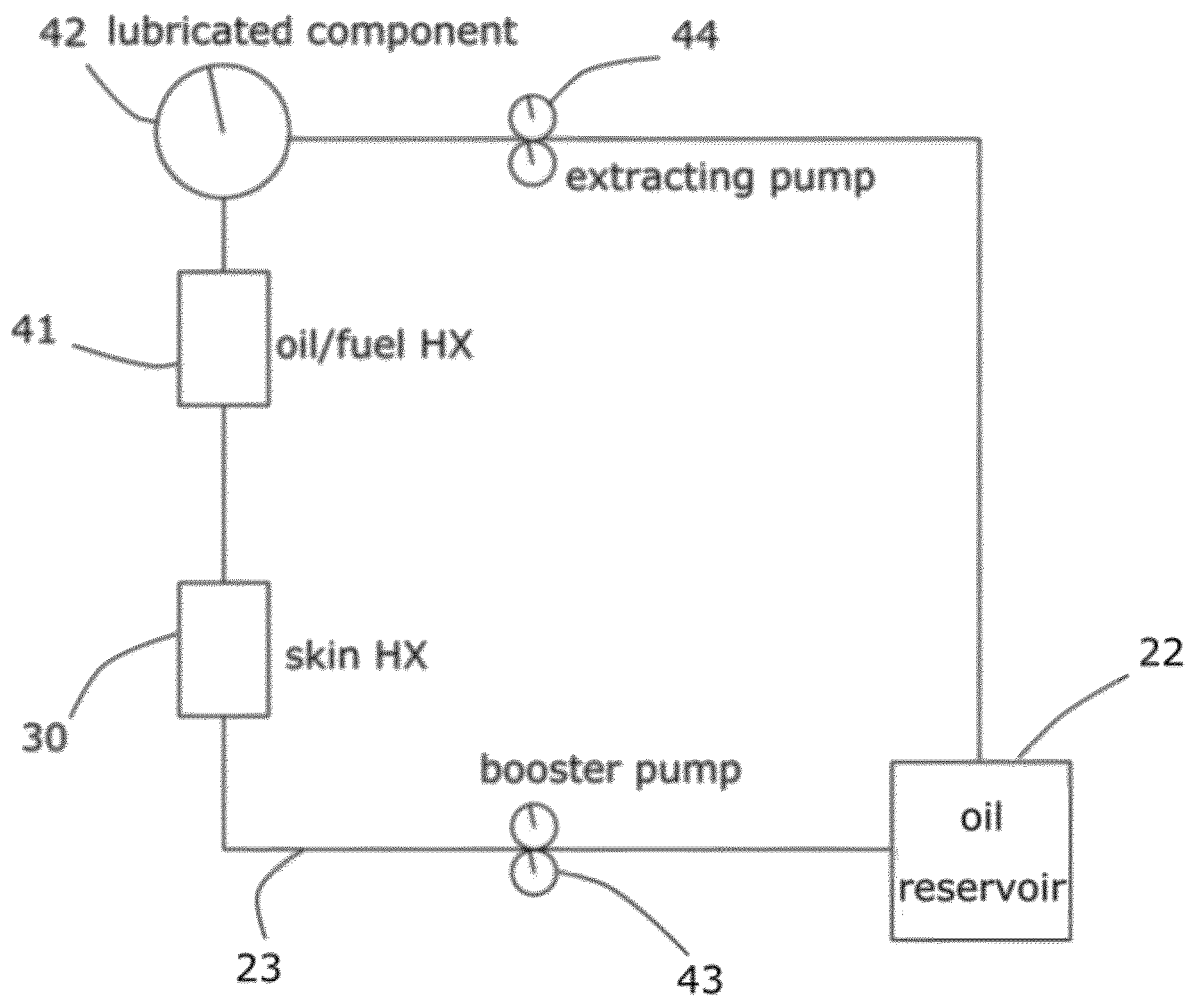
FIG. 3 is a schematic view of a lubrication circuit of a propulsion engine according to one embodiment of the invention.

FIG. 3 schematically shows a lubrication circuit according to one embodiment of the invention, provided with a cooling system according to one embodiment.

The lubrication circuit 20 comprises an oil reservoir designed to be able to deliver an oil at a temperature which is, for example, between 100° C. and 160° C.

The circuit according to the embodiment of FIG. 2 also comprises a booster pump 43 for pumping the oil from the reservoir to the oil flow channels of the skin exchanger 30.

The cooling of the oil of the lubrication circuit 20 is provided by a skin exchanger 30 arranged on an inner wall of the outer casing of the propulsion engine, between the fan and the rectifier arms of the engine. This skin exchanger therefore makes it possible to cool the oil received from the reservoir by means of heat exchanges with the air flowing through the secondary channel of the engine. The air flowing through the secondary channel reaches a temperature of approximately 80° C. so that at the outlet of the skin exchanger 30 the oil is cooled to a temperature c of between 90° C. and 150° C., depending on the temperature of the oil upstream of the skin exchanger.

According to the embodiment of FIG. 3, the cooling of the oil can also be provided by an additional oil/fuel heat exchanger 41, better known by the acronym FCOC ("Fuel Cooled Oil Cooler"). The fuel entering the heat exchanger reaches a temperature of between 40° C. and 60° C., so that the oil at the outlet of the exchanger is cooled to a temperature of between 70° C. and 120° C., depending on the temperature of the oil downstream of the skin exchanger.

The lubricating oil can then be injected into a component 42 of the engine to be lubricated. Said component can be a power transmission box, a bearing, a thrust bearing, a gear, an accessory box and in general any component to be lubricated (or to be cooled when applying the invention to a circuit for cooling a cooling fluid).

The oil coming out of these lubricated elements reaches a temperature of between 100° C. and 140° C. and is re-injected into the oil reservoir 22 by means of an extraction pump 44.

Of course, the temperature levels of the lubricating oil are given only by way of illustration and depend on the lubricating oil in question, on the circuitry of the skin exchanger, on the flight conditions which determine the temperature of the air flowing through the secondary channel, and on the lubricated components 42.

The lubrication circuit can also comprise an oil/air heat exchanger 33, better known by the acronym ACOC ("Air-Cooled Oil Cooler"), which allows the oil to be cooled by heat exchanges with the air bled from the secondary channel at a temperature of 120° C. This oil can then be injected into the turbomachine 14 to reach a temperature of 180° C. at the outlet, and return to the oil reservoir.

The invention claimed is:

1. A system for cooling a fluid of a fluid circuit, for lubricating or cooling at least one component of a propulsion engine of an aircraft, the engine comprising an outer casing which extends in a longitudinal direction between an air inlet opening and an ejection nozzle, a turbomachine having a turbomachine casing secured inside said outer casing by rectifier arms, and a fan arranged at said air inlet opening of said outer casing, upstream of said turbomachine, and adapted to generate a primary air flow feeding said turbomachine and a secondary air flow feeding a secondary channel, formed between said outer casing and said turbomachine casing, said cooling system comprising:
   a skin exchanger comprising a smooth heat exchanger excluding a fin immersed in said secondary air flow, and which is the skin exchanger arranged on an inner wall of said outer casing, longitudinally between said fan and said rectifier arms, said skin exchanger fluidly communicating with said fluid circuit and adapted to provide heat exchanges between said fluid of said fluid circuit and the air flowing through said secondary channel, wherein the inner wall of the outer casing has a continuous outer surface in direct contact with the secondary air flow, and the heat exchanger is positioned radially outward of the continuous outer surface.

2. The system according to claim 1, wherein said skin exchanger is curved.

3. The system according to claim 1 wherein said skin exchanger extends over an entire circumference of said inner wall of said outer casing.

4. The system according to claim 1 wherein said fluid circuit is a lubrication circuit, said fluid is a lubricating oil and said skin exchanger comprises flow channels for this lubricating oil.

5. The system to claim 1 wherein said fluid circuit is a cooling circuit, said fluid is a cooling fluid and said skin exchanger comprises flow channels for this cooling fluid.

6. A fluid circuit, for lubricating or cooling a component of a propulsion engine of an aircraft, the engine comprising an outer casing which extends in a longitudinal direction between an air inlet opening and an ejection nozzle, a turbomachine having a turbomachine casing secured inside said outer casing by rectifier arms, a fan arranged at said air inlet opening of said outer casing, upstream of said turbomachine, and designed to be able to generate a primary air flow feeding said turbomachine and a secondary air flow feeding a channel, referred to as a secondary channel, formed between said outer casing and said turbomachine casing, said fluid circuit comprising:
   a lubricating or cooling fluid reservoir;
   a plurality of components of said engine to be lubricated and/or cooled; and
   at least one fluid flow pipe connecting said fluid reservoir and said plurality of components of said engine to be lubricated and/or cooled,
   wherein said circuit further comprises a cooling system comprising a skin exchanger comprising a smooth heat exchanger excluding a fin immersed in said secondary air flow, and which is the skin exchanger arranged on an inner wall of said outer casing, longitudinally between said fan and said rectifier arms, said skin exchanger fluidly communicating with said fluid circuit and adapted to provide heat exchanges between said fluid of said fluid circuit and the air flowing through said secondary channel, wherein the inner wall of the outer casing has a continuous outer surface in direct contact with the secondary air flow, and the heat exchanger is positioned radially outward of the continuous outer surface.

7. A method for channeling a fluid of a fluid circuit to lubricate or cool a component of a propulsion engine of an aircraft, the engine comprising an outer casing which extends in a longitudinal direction between an air inlet opening and an ejection nozzle, a turbomachine having a turbomachine casing secured inside said outer casing by rectifier arms, and a fan arranged at said air inlet opening of said outer casing, upstream of said turbomachine, and adapted to generate a primary air flow feeding said turbomachine and a secondary air flow feeding a channel, referred to as a secondary channel, formed between said outer casing and said turbomachine casing, said method comprising:
   arranging a skin exchanger on an inner wall of said outer casing, longitudinally between said fan and said rectifier arms, wherein the inner wall of the outer casing has a continuous outer surface in direct contact with the secondary air flow, and the heat exchanger is positioned radially outward of the continuous outer surface; and
   placing said skin exchanger in fluid communication with said fluid circuit in order to be able to provide heat exchanges between said fluid of the fluid circuit and the air flowing through said secondary channel.

8. The method according to claim 7, wherein the arranging of the skin exchanger on the inner wall of said outer casing includes arranging said skin exchanger over an entire circumference of said inner wall of said outer casing.

\* \* \* \* \*